United States Patent
Coffey et al.

(10) Patent No.: US 7,505,525 B2
(45) Date of Patent: Mar. 17, 2009

(54) METHODS AND APPARATUS FOR SELF-INVERTING TURBO CODE INTERLEAVING WITH HIGH SEPARATION AND DISPERSION

(75) Inventors: John T. Coffey, San Francisco, CA (US); Chris D Heegard, Key West, FL (US)

(73) Assignee: Texas Instruments Incorporated, Dallas, TX (US)

(*) Notice: Subject to any disclaimer, the term of this patent is extended or adjusted under 35 U.S.C. 154(b) by 519 days.

(21) Appl. No.: 11/402,754

(22) Filed: Apr. 12, 2006

(65) Prior Publication Data

US 2006/0198456 A1  Sep. 7, 2006

Related U.S. Application Data

(62) Division of application No. 10/436,617, filed on May 13, 2003, now Pat. No. 7,082,168.

(60) Provisional application No. 60/382,493, filed on May 21, 2002.

(51) Int. Cl.
*H04L 5/12* (2006.01)
*H04L 23/02* (2006.01)

(52) U.S. Cl. .............. 375/262; 375/265; 714/702
(58) Field of Classification Search ............ 375/262, 375/265, 241; 714/701, 702, 756, 787, 790, 714/794, 795

See application file for complete search history.

(56) References Cited

U.S. PATENT DOCUMENTS

| | | | |
|---|---|---|---|
| 6,453,442 B1* | 9/2002 | Sadjadpour et al. | 714/787 |
| 6,728,927 B2* | 4/2004 | Crozier | 714/790 |
| 2002/0194554 A1* | 12/2002 | Ferrari et al. | 714/701 |

* cited by examiner

*Primary Examiner*—Phuong Phu
(74) *Attorney, Agent, or Firm*—Steven A. Shaw; W. James Brady; Frederick J. Telecky, Jr.

(57) ABSTRACT

The present invention provides methods for generating self-inverting turbo code interleavers having high separation and high dispersion characteristics. Methods are provided for deterministically generating self-inverting turbo code interleavers from a specification for an existing non-self-inverting interleaver. Methods are also provided for randomly generating self-inverting turbo code interleavers. The present invention also provides methods and apparatus for encoding digital data and communicating the digital data using self-inverting turbo code interleavers/de-interleavers.

14 Claims, 2 Drawing Sheets

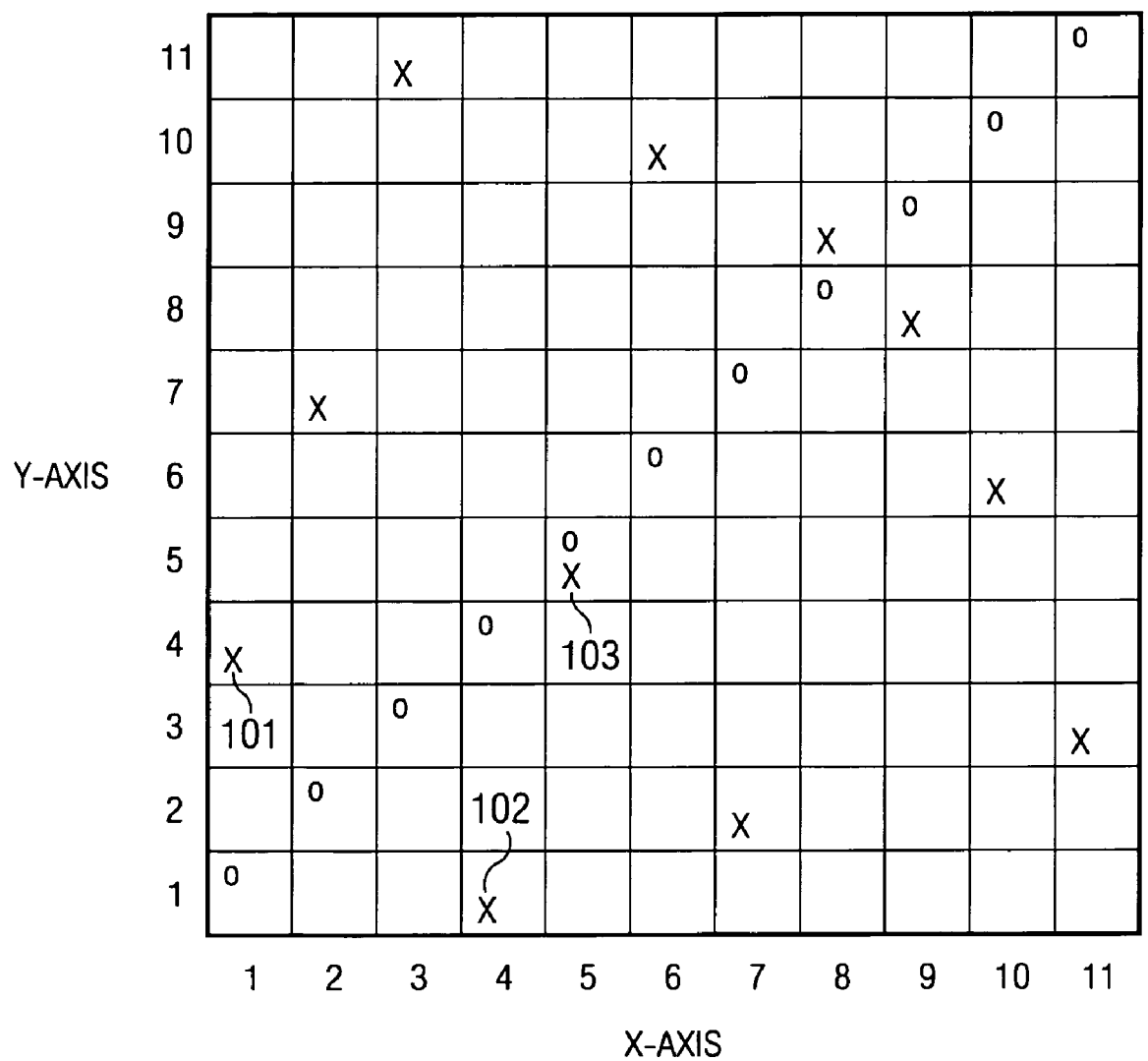

METHODS AND APPARATUS FOR SELF-INVERTING TURBO CODE INTERLEAVING WITH HIGH SEPARATION AND DISPERSION

CROSS-REFERENCE TO RELATED APPLICATIONS

This application is a Divisional of and claims priority under 35 U.S.C. §120 to U.S. patent Ser. No. 10/436,617, filed May 13, 2003 now U.S. Pat. No. 7,082,168 which claims the benefit of U.S. provisional patent application No. 60/382,493 filed on May 21, 2002, which is incorporated herein and made a part hereof by reference.

BACKGROUND OF THE INVENTION

1. Field of the Invention

The present invention is directed to digital communications systems, processes, apparatus and related software utilizing error-correcting codes. More particularly, the invention relates to self-inverting interleavers/de-interleavers for use with wireless communication systems that rely on turbo-codes to perform signal error-correction. Accordingly, the general objects of the invention are to provide novel systems, methods, apparatus and software of such character.

2. Description of the Related Art

The field of error control coding was revolutionized in 1993 with the invention of turbo codes. With the use of turbo codes, it is possible to achieve extremely low error probabilities at low signal to noise ratios with decoding circuitry that is within the realm of practical implementation. A turbo code system can be thought of as a way of forming a very strong code from a suitable combination of two or more weak codes. The goal is to achieve the performance of the strong code with the decoding complexity implied by the weak codes. One important factor in the success of a turbo code design is that most of the error sequences that cause one of the constituent codes to fail must be decoded correctly by the other constituent code (this property being implied by the constraint that the overall code must be stronger than each individual code). The most basic turbo code system operated by (1) encoding a stream of data using one recursive convolutional code, (2) permuting ("interleaving") the same stream of data, (3) encoding the permuted data using a recursive convolutional encoder, and (4) transmitting both streams as the signal.

At the receiving end of the basic turbo code system, decoding proceeded iteratively. In particular, a first decoder decoded the received demodulated sequence for the first convolutionally coded stream. Then, the resulting estimates (and associated estimates of the reliability of those estimates) were interleaved and fed to a second decoder, which used them as an aid in decoding the second convolutionally encoded sequence. The resulting estimates for the second decoder were then de-interleaved and fed to the first decoder for the first sequence. Finally, they were used in a second pass of decoding. This procedure may have continued for several iterations as desired.

One important feature of turbo code communications systems is an element referred to as an "interleaver" (or, alternatively, "permuter" or "shuffler"). The general function of an interleaver is to receive a set of bits or symbols and to rearrange them into a different order.

In designing a useful interleaver there are two competing goals: the interleaver should have high performance and it should have low implementation complexity. Several different design rules have been suggested for the design of turbo code interleavers and two interleaver attributes are widely accepted as reliable indicia of interleaver performance. The first is "separation" which requires that two symbols that are close together in the original sequence should be far apart in the interleaved sequence. To a first order approximation, the influence of one symbol on another declines as the distance between them in the sequence increases. It is, therefore, desirable to preclude the possibility that two erroneous symbols are in close proximity in both the original and interleaved sequences. The second is "dispersion." A large dispersion is desirable because the error probability in a turbo code system is driven by a combination of several different types of basic failure mechanisms. The use of interleavers with a large dispersion reduces the number of dominant error mechanisms.

These two attributes may be quantified as follows. The "separation" or "s-parameter" of an interleaver is the smallest number such that two inputs to the interleaver at a distance less than s from each other are guaranteed to be mapped, by the interleaver, to outputs that are at distance at least s apart. Interleavers may be represented by an interleaver scatter plot, which is a two-dimensional plot in which a point is plotted for every pair $(i, \pi(i))$. Equivalently, the same information may be expressed as an n×n matrix containing a 1 at every point of the interleaver scatter plot and 0 elsewhere; this matrix will be referred to as the permutation matrix associated with the interleaver. If the interleaver has an s-parameter value of s0, then a box centered at an interleaver point and extending a distance s0 in each direction will include no other interleaver points.

Dispersion may be expressed in terms of displacement vectors $(\Delta x = j - i, \Delta y = \pi(j) - \pi(i))$ for any pair of inputs i,j where i<j. Dispersion is the number of distinct displacement vectors that occur out of the $n(n-1)/2$ possible vectors. The "normalized dispersion" is the ratio of the actual dispersion to the maximum possible dispersion.

The simplest known interleavers are "rectangular" or "block" interleavers. These interleavers store data streams into a rectangular array row by row, and read out the stored data column by column. Among previously known interleavers, a subclass of the block interleavers are easily shown to be self-inverting. An N×M block interleaver on blocks of size n=N M has permutation function given by $\pi(i) = (M \cdot i) \bmod (N\,M-1)$ if we number the positions from 0 to n−1 rather than from 1 to n. The self-inverting constraint requires that $\pi(\pi(i)) = i$. This condition is satisfied if N=M as then $\pi(\pi(i)) = \pi(M \cdot i) \bmod (N\,M-1) = (M^2 i) \bmod (M^2-1) = i$.

It can be shown that the normalized dispersion of block interleavers approaches zero. Such an interleaver, however, has an s-parameter of $\sqrt{n}$ which is the highest possible s-parameter for an interleaver. Nonetheless, the dispersion of this interleaver is so low that it gives poor performance in practice. Furthermore, it is known that block interleavers give markedly inferior performance in turbo coding applications because such interleavers are subject to a significant "error floor" problem, in which error probability decays very slowly with increasing signal to noise ratio beyond a given point. This too is a major reason for the poor performance of such block interleavers.

Interleavers are used in various places in communications systems. Interleavers with good properties for some applications do not necessarily work well in the turbo coding framework. Various properties have been used to express the quality of an interleaver. For example, separation is a widely used measure of interleaver quality. The block interleavers discussed above can provide a very good separation measure. However, for turbo codes, interleavers are needed which simultaneously have several good qualities. For example, it is desirable for interleavers for turbo coding have good separation and at least one other good property, such as dispersion. None of the related prior art interleavers simultaneously offer he qualities of high separation, large dispersion and self-inversion.

As a result of such deficiencies, recent interleaver design efforts have focused on identifying interleavers that perform better than the basic block interleavers described above. For example, much work has been done on pseudo-random or deterministic interleavers, i.e., on the production of deterministic rules that succinctly describe an interleaver that performs well. These include Berrou-Glavieux interleavers, Welch-Costas interleavers, JPL interleavers, Takeshita-Costello interleavers, and others. The advantages offered by deterministic interleavers are based on the recognition that deterministic interleavers consume fewer system resources compared to unstructured or random interleavers. This advantage, however, is only beneficial if the deterministic specification can be efficiently implemented in the decoder. For many applications, such as a turbo coding chip, the processing of algorithmic instructions with interleaver circuitry is either not feasible or itself consumes excessive resources.

One significant deficiency associated with most conventional interleavers is that they result in considerable circuit complexity when physically implemented in a communications system. Naturally, this complexity also increases the cost of implementing an effective interleaver. In part, this difficulty arises from the fact that conventional interleaver design often starts with the derivation of an elegant mathematical formula, and then seeks a circuit design to implement that formula. Too often, this approach results in a complicated, inefficient and expensive circuit despite the fact that it may perform in accordance with a relatively simple and elegant mathematical formula.

This problem is further exacerbated by the fact that, for each interleaver designed and implemented, a compatible de-interleaver must also be designed and implemented to reverse the interleaving process during use of a given system. Thus, the negative impact of relying on unnecessarily complex circuitry is typically two-fold.

There is, accordingly, a need in the art for novel and more cost-effective methods, systems and apparatus for reducing errors in turbo code communications systems. Such methods and apparatus should yield simpler, or at least less expensive, implementing interleaver/de-interleaver circuitry while still yielding a level of effectiveness that is equal to or greater than conventional turbo code interleaving methods and apparatus.

The self-inverting turbo code interleavers of the present invention provide the foregoing advantages. Numerous other advantages and features of the present invention will become apparent to those of ordinary skill in the art from the following description of the example embodiments, from the claims and from the accompanying drawings.

SUMMARY OF THE INVENTION

The present invention satisfies the above-stated needs and overcomes the above-stated and other deficiencies of the related art by providing methods, systems and apparatus for reducing the impact of errors in digital communications systems through the use of self-inverting interleavers/de-interleavers. In particular, the present invention is directed to self-inverting interleaving in which both high separation and high dispersion are achieved. The present invention offers the possibility of nearly halving the amount of necessary circuitry to perform interleaving and de-interleaving functions in a turbo code system. For example, significant advantages are achieved in that one physical implementation of dual-function circuitry can be utilized to perform both interleaving and de-interleaving functions. This eliminates the need of the prior art to provide separate circuitry to perform each of these functions independently and, thereby, reduces the amount of necessary circuitry by nearly fifty percent.

The present invention stems from the realization that there is often little correspondence between the simplicity/complexity of a mathematical function and the actual complexity of the circuitry necessary to implement that function. Ideally, interleaver/de-interleaver designs in accordance with the present invention should have high separation and dispersion, and, in addition, should be easy to implement. Thus, the present invention lends design primacy to the goal of reducing circuit complexity rather than striving for concise mathematical expressions. For example, the present invention enables a large gate savings (by a factor of 2 or more) in the interleaver implementation.

The present invention provides methods of generating a self-inverting turbo code interleaver from an existing non-self-inverting turbo code interleaver specification. In an example implementation of the invention, a plurality of original cycles of the non-self-inverting turbo code interleaver specification are identified. The original cycles specify a mapping of an input bit position to a respective output bit position for raw data bits to be coded. The last bit identified in each cycle is mapped to an output position corresponding to the first bit in said original cycle. Each original cycle containing more than two bits is broken into new cycles, such that each new cycle contains one pair of bits. The pair of bits for each successive cycle being taken from successive pairs of bits of the original cycle beginning with the first bit in each cycle. Each original cycle which has an odd number of bits provides: (i) at least one new cycle containing a pair of bits; and (ii) one new cycle having a single bit. The new cycles define the mapping between the input and output bit positions for said self-inverting turbo code interleaver.

The self-inverting turbo code interleaver may have a normalized dispersion of at least 0.33 and/or a normalized s-parameter of at least 33. The original non-self-inverting interleaver may be a block interleaver. The block length of the original interleaver may be at least 1024.

The present invention further provides methods for randomly generating a self-inverting turbo code interleaver. An example implementation of such a method is as follows:
 (a) setting a minimum target separation value S, such that two input bits less than S apart at the input are at least S apart at the output of the interleaver;
 (b) mapping a first input bit position to a randomly chosen output bit position j;
 (c) constraining input position j to map to the first input bit position, j being randomly chosen from all allowed output positions which do not violate the target separation value S;
 (d) for each of the remaining input bits, in sequence:
  computing all remaining allowed output bit positions of each successive input bit that does not violate the target separation value S when an input bit position corresponding to the allowed output bit position is constrained to map to an output position corresponding to the respective successive input bit position;
  choosing one of the remaining allowed output bit positions of the respective input bit at random;
  constraining the input bit position corresponding to the chosen output bit to map to an output bit position corresponding to the respective successive input bit position.

In the event that step (d) results in failure when no remaining output bit positions are allowed for one of the remaining input bits, discarding results of steps (b-d) and repeating steps (b-d) until all of the input bits are mapped to corresponding allowed output values.

Alternatively, in the event that step (d) results in failure when no remaining output bit positions are allowed for one of the remaining input bits, discarding results of step (d) and repeating step (d) until all of said remaining input bits are mapped to corresponding allowed output values.

In a further example implementation, in the event that step (d) results in failure when no remaining output bit positions are allowed for one of the remaining input bits, discarding results of step (d) for a selected number of m previous bits in the sequence prior to said failure and repeating step (d) beginning with said mth previous bit in said sequence. The number m of previous bits may vary with each successive iteration of step (d).

The present invention is further directed to methods and apparatus for encoding a data stream using self-inverting turbo code interleavers. Further, methods and apparatus are provided for communicating a data stream, which utilize self-inverting turbo code interleavers/de-interleavers to perform error-correction on the data stream sent via the communications system. The self-inverting turbo code interleaver/de-interleaver of the present invention has at least one of a normalized s-parameter of at least 33 and/or a normalized dispersion of at least 0.5. The "normalized" dispersion is the ratio of the actual dispersion to the maximum possible dispersion. The "normalized" s-parameter is the ratio of the actual s-parameter to the maximum possible s-parameter, and may be expressed as $100(s/\sqrt{n})$.

In an example embodiment of the invention, methods and apparatus are provided for encoding and communicating digital data for transmission. In this example embodiment, a parallel encoding scheme is used. An original data stream is encoded at a first encoder with a first convolutional code to produce a first convolutionally coded data stream. A copy of the original data stream is interleaved at a self-inverting turbo code interleaver to produce an interleaved data stream. The self-inverting turbo code interleaver has at least one of a normalized s-parameter of at least 33 and a normalized dispersion of at least 0.5. The interleaved data stream is encoded at a second encoder with a second convolutional code to produce a second convolutionally coded data stream. The first convolutionally coded data stream and the second convolutionally coded data stream are then combined to provide a combined data stream. The combined data stream is then modulated at a modulator for transmission via a communications network.

The communications system may comprise at least one of a global communication system, an Internet, an extranet, a wide area network, a local area network, a wireless network, a combination of interconnected networks of various types, or the like.

In an alternate embodiment of the invention, the normalized dispersion may be at least 0.67 and the normalized s-parameter may be at least 50.

At the receiver side of the communications system, the modulated combined data stream is received at a receiver. The modulated combined data stream is demodulated at a demodulator. The first convolutionally coded data stream is decoded at a first decoder to produce first reliability estimates for raw data bits of the original data stream. The first reliability estimates are de-interleaved at a first de-interleaver to produce de-interleaved first reliability estimates. The second convolutionally coded data stream is decoded at a second decoder using the de-interleaved first reliability estimates to produce second reliability estimates for the raw data bits of the original data stream. The second reliability estimates are then de-interleaved at a second de-interleaver to provide de-interleaved second reliability estimates. A feedback loop is provided for feeding the de-interleaved second reliability estimates into the first decoder for second pass decoding and de-interleaving of the first and second convolutionally coded data streams to recover the original data stream.

Those skilled in the art will appreciate that additional decoding and de-interleaving passes may be performed, as necessary, to recover the original data stream.

In a further example embodiment in accordance with the present invention, the encoding of the digital data stream may occur in a serial manner. In this example embodiment, the original data stream is encoded at a first encoder with a first convolutional code to produce a first convolutionally coded data stream. This first convolutionally coded data stream (rather than the original data stream as in the example embodiment described above) is then interleaved using a self-inverting turbo code interleaver having at least one of a normalized s-parameter of at least 33 and a normalized dispersion of at least 0.5 to produce an interleaved data stream. The interleaved data stream is then encoded at a second encoder with a second convolutional code to produce a second convolutionally coded data stream. The first convolutionally coded data stream and the second convolutionally acoded data stream are then combined to provide a combined data stream. This combined data stream is then modulated for transmission via a communications network. The recovery of the original data stream at the receiver side occurs in the same manner as described in connection with the parallel encoding scheme described above.

The interleavers provided by the present invention may be implemented in the form of a semiconductor chip for performing turbo code error-correction wherein the chip includes an interleaver/de-interleaver for interleaving a data stream prior to transmission via the communications system, wherein the interleaver/de-interleaver having a normalized s-parameter of at least 33 and a normalized dispersion of at least 0.5, and wherein the interleaver/de-interleaver also de-interleaves the received data stream to thereby recover the data stream from the received data stream. The semiconductor chip may be a processor chip with a demodulator, a detector, a decoder, and the like. The chip may also be a cellular telephone integrated circuit.

For illustration purposes, a simplified example of a turbo coding method is provided. Assume that raw data bits 10011 are input into an encoder block. The encoder block, using a turbo code, takes the five raw data bits 10011 and outputs, for example, 15 data bits. The turbo code may use two smaller constituent codes, code 1 and code 2. The raw data bits are sent through code 1, providing 5 "new" parity bits of output. For example, for code 1, input of raw data bits 10011 may provide 10011 01110 output. For code 2, the raw data bits are fed in, but they are scrambled first (i.e., interleaved). This portion of the encoder block is the "turbo code interleaver". As an example, the scrambling rule may require that bit 1 moves to bit 4, bit 4 moves to bit 2, bit 2 moves to bit 1, and bits 3 and 5 interchange. This scrambling rule may be written as (1->4->2) (3->5), where the last bit in each cycle is understood to map back to the first (2->1 and 5->3). This may sometimes be written without the arrows as (1 4 2) (3 5). Therefore, the raw data bits 10011 would be scrambled to provide 01110, which is fed into code 2. As an example, code 2 may output 01110 11000 (i.e., that the parity bits of code 2 are 11000 based on the scrambled input). The overall output of this (relatively small) turbo coding system would be 10011 01110 11000. The scrambled raw data (i.e., 01110) is usually not sent in addition to the true raw data (i.e., 10011). Once this data has been output by the turbo coder, there are many other operations that are performed on the data as will be apparent to those skilled in the art which are not pertinent to the present invention (e.g., modulating the data with a carrier signal, and the like). The foregoing turbo coding example is a simplistic example and does not describe a self-inverting interleaver. An interleaver is self-inverting if and only if it interleaves the raw data by interchanging bit positions with one another or leaving bits in the original position. The above example is not self-inverting, as it sends bit 1 to bit 4, but does not send bit 4 to bit 1.

BRIEF DESCRIPTION OF THE DRAWINGS

The present invention will hereinafter be described in conjunction with the appended drawing figures, wherein like numerals denote like elements, and:

FIG. 3 shows an example scatter plot for an 11×11 self-inverting interleaver.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
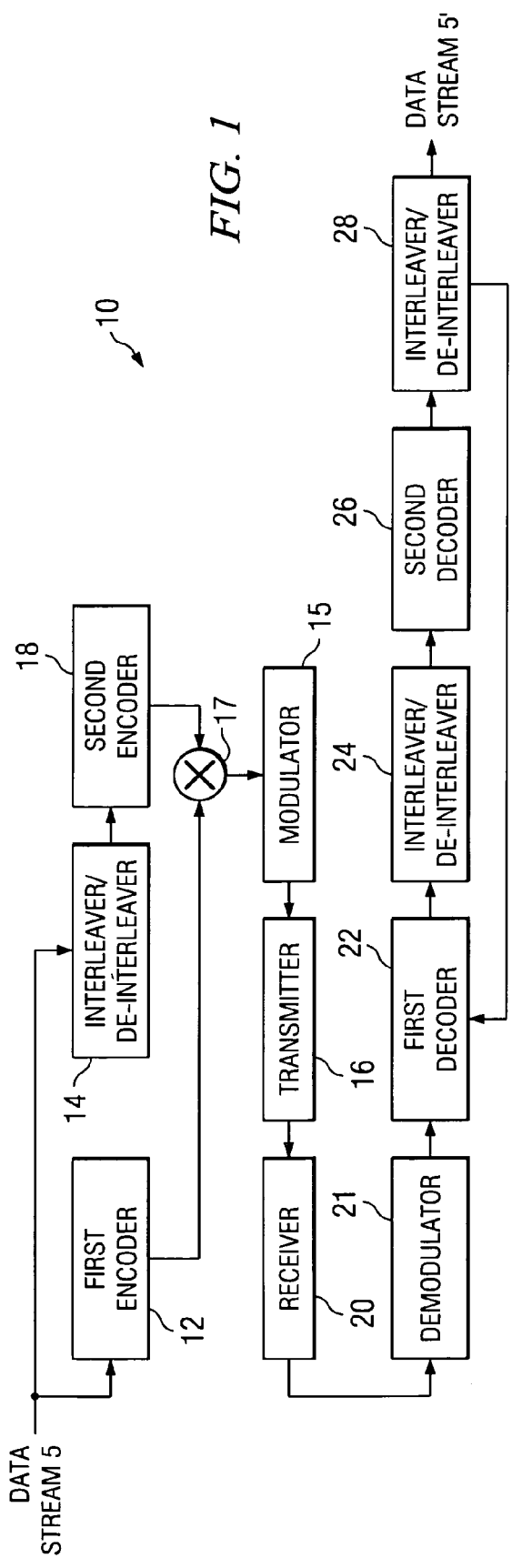
FIG. 1 shows a block diagram of an example embodiment of the present invention.

FIG. 1 shows an example embodiment of a communication system 10 in accordance with the invention which utilizes a parallel encoding scheme. Data stream 5 is split to provide parallel inputs into the system 10. The data stream 5 is encoded at encoder 12 with a first recursive convolutional code to create a first convolutionally coded data stream. Simultaneously, the data stream 5 is interleaved at interleaver/de-interleaver 14 using a self-inverting interleaver in accordance with the present invention. Then, the interleaved data stream is output from the interleaver 14 and is encoded at a second encoder 18 with a second recursive convolutional code to create a second convolutionally coded data stream. The first convolutionally coded data stream from the first encoder 12 and the second convolutionally coded data stream from the second encoder 18 are then combined at combiner 17 and then modulated for transmission at modulator 15.

The modulator 15 encompasses all operations required to turn the encoded bit stream into a signal suitable for transmission over a communication channel. These operations may include, but are not limited to, scrambling, symbol interleaving, mapping to signal space symbols, pilot insertion, cyclic prefix addition, and the like. These are elements that are not essential to the current invention and are also familiar to those skilled in the art.

The signal output from the modulator is provided to a transmitter 16 for transmission to a receiver 20. The signal is received at the receiver 20. The received signal is demodulated at demodulator 21 to provide the combined data stream including the first and second convolutionally encoded data streams. Those skilled in the art will appreciate that the demodulator 21 provides functions analogous to those of the modulator 15. A first decoder 22 decodes the first convolutionally coded stream, producing first reliability estimates for each of the underlying raw data bits of the original data stream. These first reliability estimates from the decoding of the first convolutionally encoded data stream are scrambled at interleaver/de-interleaved 24 using a self-inverting interleaver in accordance with the present invention. These scrambled (i.e. de-interleaved) estimates are input into a second decoder 26 for use in decoding the second convolutionally coded data stream, Decoder 26 produces second reliability estimates for each of the underlying raw data bits of the original data stream. Finally, de-interleaving of these second reliability estimates occurs at interleaver/de-interleaver 28. The results from de-interleaver 28 are fed back to the first decoder 22, and are used in a second pass of decoding. This procedure may be repeated for several iterations, as desired, to recover the original data stream 5' at the output of the communication system 10.

Figure 2:
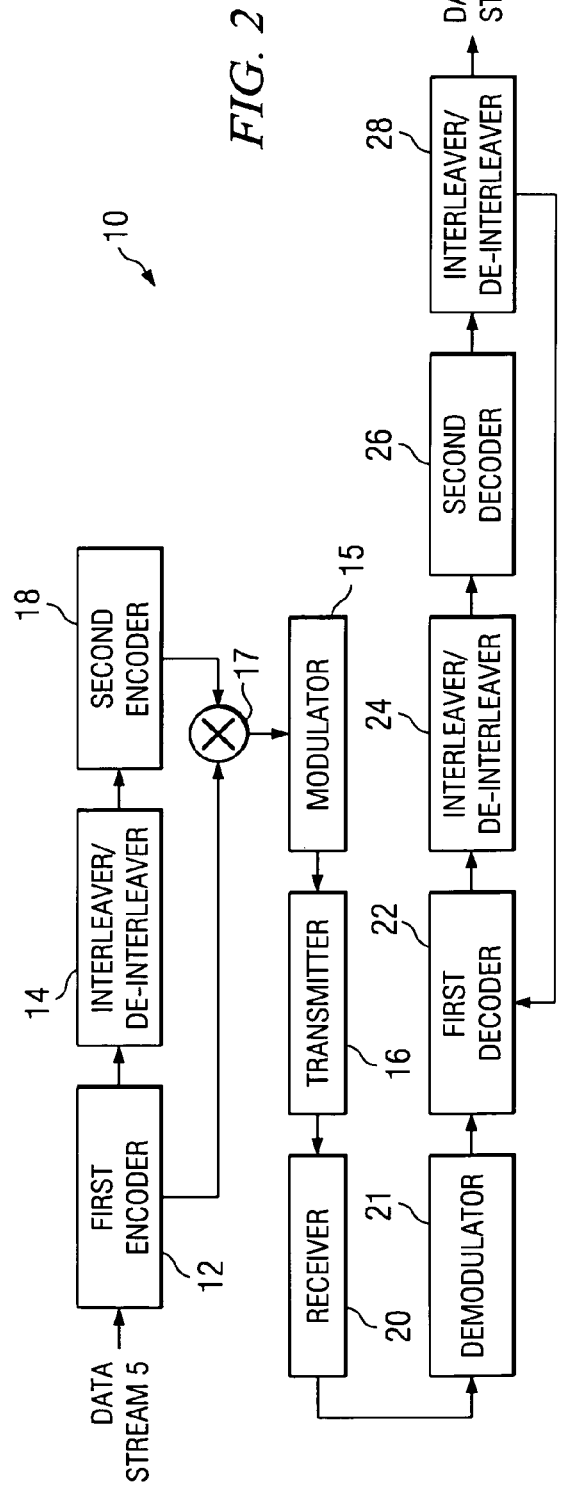
FIG. 2 shows a block diagram of a further example embodiment of the present invention.

An example embodiment of a communication system in accordance with the invention which utilizes a serial encoding scheme is shown in FIG. 2. Data stream 5 is encoded at encoder 12 with a first recursive convolutional code to create a first convolutionally coded data stream. The first convolutionally coded data stream is then interleaved at interleaver/de-interleaver 14 using a self-inverting interleaver in accordance with the present invention. Then, the interleaved data stream is output from the interleaver 14 and is encoded at a second encoder 18 with a second recursive convolutional code to create a second convolutionally coded data stream. The first convolutionally coded data stream, in addition to being provided to interleaver 14, is also output from the first encoder 12 and combined with the second convolutionally coded data stream from the second encoder 18 at combiner 17. The combined data stream from combiner 17 is then modulated for transmission at modulator 15 as discussed above to provide a signal for transmission from transmitter 16. The functions of the receiver 20, demodulator 21, first decoder 22, interleaver/de-interleaver 24, second decoder 26, and interleaver/de-inerleaver 28 remain as described in connection with the example embodiment shown in FIG. 1

As noted above, one aspect of the present invention is the use of "self-inverting" interleavers/de-interleavers. The quality of self-inversion is defined as follows: given any permutation, there is a least number i such that the permutation applied i times leaves the data in the original order where i is the period of permutation. For example, the small turbo coding interleaver provided as an example above was defined by (1->4->2) (3->5), which has a period of six. A self-inverting interleaver applied to interleaved data gives back the original input. Therefore, self-inverting interleavers have a period two permutation (i.e. wherein a second application of the permutation restores all elements to their original places).

Self-inverting interleavers can also be expressed in terms of an interleaver scatter plot/permutation matrix. FIG. 3 shows an example scatter plot diagram 100 for an 11×11 self-inverting interleaver (i.e. an interleaver having a period of 2). The plot 100 of a self-inverting interleaver is symmetrical about a diagonal line running from the origin at the lower left-hand corner toward the top right at an angle of 45 degrees. This line is shown by "o" in FIG. 3, which designates all the boxes for which x=y. In the diagram shown in FIG. 3, the boxes on the x-axis are numbered 1 to 11, going from left to right. The boxes on the y-axis are labeled 1 to 11 going from bottom to top. An "X" is given to specify the particular pattern of the example interleaver used. For example, the "X" in box 101 (x=1, y=4) indicates that position 1 going in to the interleaver is mapped to bit 4 at the output. The self-inverting property then demands that position 4 in maps to position 1 out, i.e., that there is an "X" in box 102 (x=4, y=1).

In the example shown in FIG. 3, an "X" is shown in box 103 (x=5, y=5), indicating that position 5 is a fixed point (i.e. the input to the interleaver is not changed), which is an acceptable characteristic of a self-inverting interleaver. Also note that there is exactly one X in each row and column, which is a required characteristic of any interleaver.

Those skilled in the art should appreciate that the scatter plot 100 shown in FIG. 3 is provided solely for purposes of illustrating the self-inverting properties of the interleaver. The interleaver used to generate the scatter plot of FIG. 3 was generated without regard to optimizing its dispersion characteristics or its s-parameter (i.e., the s-parameter of the interleaver illustrated in FIG. 3 is s=1).

Those skilled in the art should also appreciate that the present invention may be implemented using substantially self-inverting interleavers having a permutation matrix that is less than 100% symmetrical about the diagonal (e.g., interleavers having between 90% and 99.999% symmetry about the diagonal). Such interleavers would not be truly self-inverting, as they would require small tweaks to regain the original data. However, such interleavers would still provide many of the advantages and benefits of the present invention.

One significant benefit of using a self-inverting interleaver is that valuable chip real estate and other resources can be saved by using identical interleavers/de-interleavers. By utilizing a self-inverting interleaver (one in which the interleaver circuitry can also be used as the de-interleaver circuitry) system resources can be substantially reduced relative to conventional designs. Thus, in any application with significant circuitry, memory, or other resources connected with the interleaver, the required resources for each interleaver/de-interleaver are nearly halved.

The set of self-inverting interleavers that have period two is distinguished in that it forms a very small fraction of all interleavers on blocks of size n, for larger values of n. The total number of interleavers on blocks of size n is $n!=n(n-1)(n-2) \ldots 3 \cdot 2$. This number rises very quickly (much faster than exponentially) with increasing n. The number of self-inverting interleavers of size n containing no fixed points (that is, no points that are mapped to themselves by the interleaver) is (n choose n/2) $(n/2)!/2^{(n/2)}$, and the total number of self-inverting interleavers (with fixed points allowed) is $\Sigma_m$ (n choose m) (m choose m/2) $(m/2)!/2^{m/2}$. This quantity can be shown to be approximately (n/2)! (more precisely, the quantity is $(n/2)!^{(1+\epsilon)}$ where $\epsilon$ tends to 0) when n becomes large. Thus the number of self-inverting interleavers on blocks of size n is approximately the same as the total number of interleavers on blocks of size n/2.

On the other hand, although the fraction is small, the actual number of such self-inverting interleavers is large in absolute terms, and, in particular, is large enough to contain self-inverting interleavers that perform well when used in turbo coding systems. Consider first any algorithm that produces a "good" interleaver for a block of length n/2, that is, the interleaver has a high s-parameter and a high dispersion. If an interleaver of block size n is formed by using two such interleavers, with the n/2 inputs from each set mapped to the n/2 outputs from the other set, and if these mappings are collected in the appropriate way, we arrive at a symmetric permutation matrix. Its dispersion is the same as that of the original length n/2 interleaver, so its normalized dispersion is approximately ¼ as large. The s-parameter constraint is satisfied by any pair of inputs from the same set. It is possible for this first construction that the s-parameter constraint could be violated by two inputs that are close to each other but on opposite sides of the boundary between the two sets of size n/2. This problem may readily be solved, however, by starting with an interleaver for a block size of n/2+1 and constraining the last input to be mapped to itself. This interleaver can again be designed by any method applicable to the construction of interleavers. The overall interleaver of block size n can then be taken by deleting this last row and forming the same construction as above. This yields a symmetric interleaver for a block size of n, with the same s-parameter and ¼ of the normalized dispersion of the original interleaver. The same principle may be used to design self-inverting interleavers that have high performance as measured by separation and dispersion.

It is possible, using various heuristic modifications of standard search procedures, to find self-inverting interleavers that have s-parameters and dispersions that are comparable to the best unrestricted (not self-inverting) interleavers. In particular, interleavers/de-interleavers in accordance with the invention have a normalized s-parameter of at least 33 and a normalized dispersion of at least 0.5. Particularly preferred embodiments of the invention have interleavers/de-interleavers with a normalized s-parameter of at least 50 and a normalized dispersion of at least 0.67. The performance above represents a lower bound on performance for self-inverting interleavers in accordance with one example embodiment of the present invention. It should be noted by those skilled in the art that the achievable s-parameters rise in accordance with the length of the block. The maximum possible s-parameter is provided by $\sqrt{n}$ achieved by the simple block interleavers mentioned above. Self-inverting interleavers may achieve more than 50% of this maximum value, while also providing good dispersion characteristics.

The present invention also includes turbo code interleavers that provide reasonable performance and high dispersion. As a starting point, the interleaver specification for an existing, non-self-inverting interleaver of a given block length may be used. An example of such a specification for a non-self-inverting interleaver is provided by the 3GPP2 standard code interleaver (as defined in $3^{rd}$ Generation Partnership Project 2, document 3GPP2 C.S0002-C, version 1.0, May 28, 2002). Such an interleaver may be specified by a complicated algorithmic method. The new self-inverting interleaver may be defined from the existing specification in a way that it is guaranteed to be self-inverting. Such a self-inverting interleaver may be defined by specifying sets of cycles. For example, the block length 5 interleaver example provided above (i.e., with raw data bits 10011) is specified by the rule (1->4->2) (3->5), where the last bit in each cycle is understood to map back to the first (2->1 and 5->3). As discussed above, such an interleaver is not self-inverting, since its period of permutation is greater than 2. A new interleaver can be defined that is guaranteed to have the self-inverting property by breaking up every original cycle provided by the non-self-inverting interleaver specification which contains more than two bits into new cycles containing pairs of bits, starting at the beginning of each original cycle and possibly leaving one bit over in its own new cycle. Continuing with the example above, this would result in the self-inverting interleaver being defined by new cycles (1->4) (2) (3->5). Thus bits 1 and 4 change positions, bits 3 and 5 change positions, and bit 2 remains in its original position. Such an interleaver is self-inverting as every new cycle has a length of 2 at the most. The resulting interleaver will have high dispersion and will work well within a turbo coding system. However, sometimes such interleavers may not have a high s-parameter.

Interleavers created using this method are "deterministic" in the sense that they are defined by a concise list of steps (i.e., all the steps required to define the original interleaver and the final pairing off step described above). The interleaver produced by this method is not the same as the original interleaver, it is merely defined by reference to it.

An ideal interleaver in accordance with the invention should have a high s-parameter, a high normalized dispersion and should be easy to physically implement. It has been found that good performance can be obtained by implementing the above-described turbo code communications system with a reasonable amount of complexity. To some extent, complexity is a matter of design choice and is largely a function of the method of decoding of the two constituent convolutional codes together with the number of decoding iterations. It is well known that the bit error probability at the output of a turbo decoder is approximately inversely proportional to the block length of the interleaver. Therefore, lower error probabilities can be achieved by utilizing interleavers/de-interleavers with longer block sizes.

A randomized method can be used to generate non-self-inverting interleavers. This method involves setting a target separation value s in advance. The method starts by mapping position 1 to a randomly chosen position. The next step involves mapping position 2. Due to the target separation value, there are constraints on the position this can map to. The method computes all allowed values of the mapped position 2 that do not violate the separation target, and chooses one of these at random. The procedure continues to map further positions in the same way, as long as this is possible. If at any step there are no possible output positions to map the next input position to, the procedure terminates in failure. The method is generally applied by running multiple runs of the method at a given interleaver length and target separation, until one successful run is obtained. The resulting dispersion tends to be good due to the randomized nature of the algorithm; if it is not, the procedure may be re-run.

An improvement contemplated by the present invention generates good self-inverting interleavers by constraining the choices at each step described above by the self-inverting property. In choosing the output position, say j, corresponding to input position 1, the input j is simultaneously constrained to map to output 1. Due to this constraint, not all output positions j are allowed for input position 1, as some positions may violate the separation constraint. This method computes all allowed output positions and chooses randomly among these. The procedure then continues analogously as to the remaining input bit positions with the procedure outlined in the preceding paragraph. When there are further positions to assign but no allowed output values for them, the procedure set forth in the preceding paragraph gives up in failure. With the present invention, in the event of such a failure the entire process, or only certain portions of the process, may be undone and rerun until all input bit positions are successfully mapped.

For example, in the event of such a failure, the results can be discarded and the process can begin again staring with the mapping of a first input bit position to a randomly chosen output bit position. Alternatively in the event of such a failure, the results of the mapping of the remaining input bit positions may be discarded and process may be rerun using the determined mappings for input position j and output position j.

As further option in the event of failure. the last m choices can be undone, where m is a heuristically set design parameter, and the procedure is then continued from that point. The failure termination criterion is based on an overall runtime limit. Multiple runs of the method with various choices for m are then carried out. This method tends to give successful runs with much higher target separations. This is contrasted with the method of the preceding paragraph, which is relatively unlikely to support high separations in one pass. Such high separations are expected to be supportable, however, if some backtracking is allowed as described herein.

Two examples self-inverting turbo code interleavers in accordance with the present invention are provided in Appendix A attached hereto. Those skilled in the art should appreciate that the example self-inverting interleavers set forth in Appendix A are just two examples of interleavers in accordance with the present invention, and other self-inverting turbo code interleavers with longer or shorter block lengths may also be generated which have the desired s-parameter and dispersion characteristics.

It should now be appreciated that the present invention provides advantageous methods and apparatus for generating self-inverting turbo code interleavers, as well as methods and apparatus for encoding and communicating a data stream utilizing such self-inverting turbo code interleavers.

Although the invention has been described in connection with various illustrated embodiments, numerous modifications and adaptations may be made thereto without departing from the spirit and scope of the invention as set forth in the claims.

What is claimed is:

1. A method for encoding digital data for transmission, comprising:
   encoding an original data stream with a first convolutional code to produce a first convolutionally coded data stream;
   interleaving a copy of said original data stream using a self-inverting turbo code interleaver having at least one of a normalized s-parameter of at least 33 and a normalized dispersion of at least 0.5 to produce an interleaved data stream;
   encoding the interleaved data stream with a second convolutional code to produce a second convolutionally coded data stream;
   combining the first convolutionally coded data stream and the second convolutionally coded data stream to provide a combined data stream;
   modulating, by a modulator, the combined data stream for transmission via a communications network.

2. A method in accordance with claim 1, wherein said normalized s-parameter is provided by:
   normalized s-parameter=$100(s/\sqrt{n})$, wherein s is the actual value of an s-parameter, and n is the block size of he interleaving.

3. A method in accordance with claim 1, wherein the communications system comprises at least one of a global communication system, an Internet, an extranet, a wide area network, a local area network, or a wireless network.

4. A method in accordance with claim 1, wherein the normalized dispersion is at least 0.67 and the normalized s-parameter is at least 50.

5. A method for communicating a data stream, comprising:
   encoding an original data stream with a first convolutional code to produce a first convolutionally coded data stream;
   interleaving a copy of said original data stream using a self-inverting turbo code interleaver having at least one of a normalized s-parameter of at least 33 and a normalized dispersion of at least 0.5 to produce an interleaved data stream;

encoding the interleaved data stream with a second convolutional code to produce a second convolutionally coded data stream;

combining the first convolutionally coded data stream and the second convolutionally coded data stream to provide a combined data stream;

modulating the combined data stream;

transmitting, by a transmitter, the modulated combined data stream via a communications network;

receiving, by a receiver, the modulated combined data stream;

demodulating the modulated combined data stream;

first pass decoding and de-interleaving of said first and second convolutionally coded data streams by:

decoding the first convolutionally coded data stream to produce first reliability estimates for raw data bits of the original data stream;

de-interleaving the first reliability estimates to produce de-interleaved first reliability estimates;

decoding the second convolutionally coded data stream using said de-interleaved first reliability estimates to produce second reliability estimates for said raw data bits of said original data stream;

de-interleaving said second reliability estimates to provide de-interleaved second reliability estimates; and feeding said de-interleaved second reliability estimates into a second pass decoding and de-interleaving of said first and second convolutionally coded data streams to recover said original data stream.

6. A method in accordance with claim 5, wherein said normalized s-parameter is provided by:

normalized s-parameter=$100(s/\sqrt{n})$, wherein s is the actual value of an s-parameter, and n is the block size of he interleaving.

7. A method in accordance with claim 5, further comprising:

additional decoding and de-interleaving passes, as necessary, to recover said original data stream.

8. Apparatus for encoding digital data for transmission;

a first encoder for encoding an original data stream with a first convolutional code to produce a first convolutionally coded data stream;

a self-inverting turbo code interleaver for interleaving a copy of said original data stream to produce an interleaved data stream, said self-inverting turbo code interleaver having at least one of a normalized s-parameter of at least 33 and a normalized dispersion of at least 0.5;

a second encoder for encoding the interleaved data stream with a second convolutional code to produce a second convolutionally coded data stream;

a combiner for combining the first convolutionally coded data stream and the second convolutionally coded data stream to provide a combined data stream;

a modulator for modulating the combined data stream for transmission via a communications network.

9. Apparatus in accordance with claim 8, wherein said normalized s-parameter is provided by:

normalized s-parameter=$100(s/\sqrt{n})$, wherein s is the actual value of an s-parameter, and n is the block size of he interleaving.

10. Apparatus in accordance with claim 8, wherein the communications system comprises at least one of a global communication system, an Internet, an extranet, a wide area network, a local area network, or a wireless network.

11. Apparatus in accordance with claim 8, wherein the normalized dispersion is at least 0.67 and the normalized s-parameter is at least 50.

12. Apparatus for communicating a data stream, comprising:

a first encoder for encoding an original data stream with a first convolutional code to produce a first convolutionally coded data stream;

a self-inverting turbo code interleaver for interleaving a copy of said original data stream to produce an interleaved data stream, said self-inverting turbo code interleaver having at least one of a normalized s-parameter of at least 33 and a normalized dispersion of at least 0.5;

a second encoder for encoding the interleaved data stream with a second convolutional code to produce a second convolutionally coded data stream;

a combiner for combining the first convolutionally coded data stream and the second convolutionally coded data stream to provide a combined data stream;

a modulator for modulating the combined data stream;

a transmitter for transmitting the modulated combined data stream via a communications network;

a receiver for receiving the modulated combined data stream;

a demodulator for demodulating the modulated combined data stream;

a first decoder for decoding the first convolutionally coded data stream to produce first reliability estimates for raw data bits of the original data stream;

a first de-interleaver for de-interleaving the first reliability estimates to produce de-interleaved first reliability estimates;

a second decoder for decoding the second convolutionally coded data stream using said de-interleaved first reliability estimates to produce second reliability estimates for said raw data bits of said original data stream; and a second de-interleaver for de-interleaving said second reliability estimates to provide de-interleaved second reliability estimates; and a feedback loop for feeding said de-interleaved second reliability estimates into said first decoder for second pass decoding and de-interleaving of said first and second convolutionally coded data streams to recover said original data stream.

13. Apparatus in accordance with claim 12, wherein said normalized s-parameter is provided by:

normalized s-parameter=$100(s/\sqrt{n})$, wherein s is the actual value of an s-parameter, and n is the block size of he interleaving.

14. Apparatus in accordance with claim 12, wherein:

additional decoding and de-interleaving passes are performed, as necessary, to recover said original data stream.

\* \* \* \* \*